(12) United States Patent
Luo et al.

(10) Patent No.: US 11,928,356 B2
(45) Date of Patent: Mar. 12, 2024

(54) SOURCE ADDRESS MEMORY MANAGMENT

(71) Applicant: Micron Technology, Inc., Boise, ID (US)

(72) Inventors: Xiangang Luo, Fremont, CA (US); Jianmin Huang, San Carlos, CA (US); Xiaolai Zhu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 17/555,160

(22) Filed: Dec. 17, 2021

(65) Prior Publication Data

US 2023/0195356 A1    Jun. 22, 2023

(51) Int. Cl.
*G06F 3/00* (2006.01)
*G06F 3/06* (2006.01)

(52) U.S. Cl.
CPC ......... *G06F 3/0655* (2013.01); *G06F 3/0604* (2013.01); *G06F 3/064* (2013.01)

(58) Field of Classification Search
None
See application file for complete search history.

(56) References Cited

U.S. PATENT DOCUMENTS

| 9,766,814 | B2* | 9/2017 | Guo | G06F 3/064 |
| 2014/0231954 | A1 | 8/2014 | Lue | |
| 2016/0179386 | A1 | 6/2016 | Zhang | |
| 2019/0155521 | A1* | 5/2019 | Bahirat | G06F 3/0619 |

FOREIGN PATENT DOCUMENTS

WO    2017074570 A1    5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Midys Rojas
(74) *Attorney, Agent, or Firm* — Brooks, Cameron & Huebsch, PLLC

(57) ABSTRACT

Methods, systems, and apparatuses related to source address memory management are described. For example, a controller can be coupled to a memory device to select a source block, a destination block, and a metadata block. The controller can store metadata indicative of an address of the source block in the metadata block. The controller can perform a memory management operation to transfer data from the source block to the destination block.

18 Claims, 7 Drawing Sheets

SOURCE ADDRESS MEMORY MANAGMENT

TECHNICAL FIELD

Embodiments of the disclosure relate generally to memory sub-systems, and more specifically, relate to source address memory management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
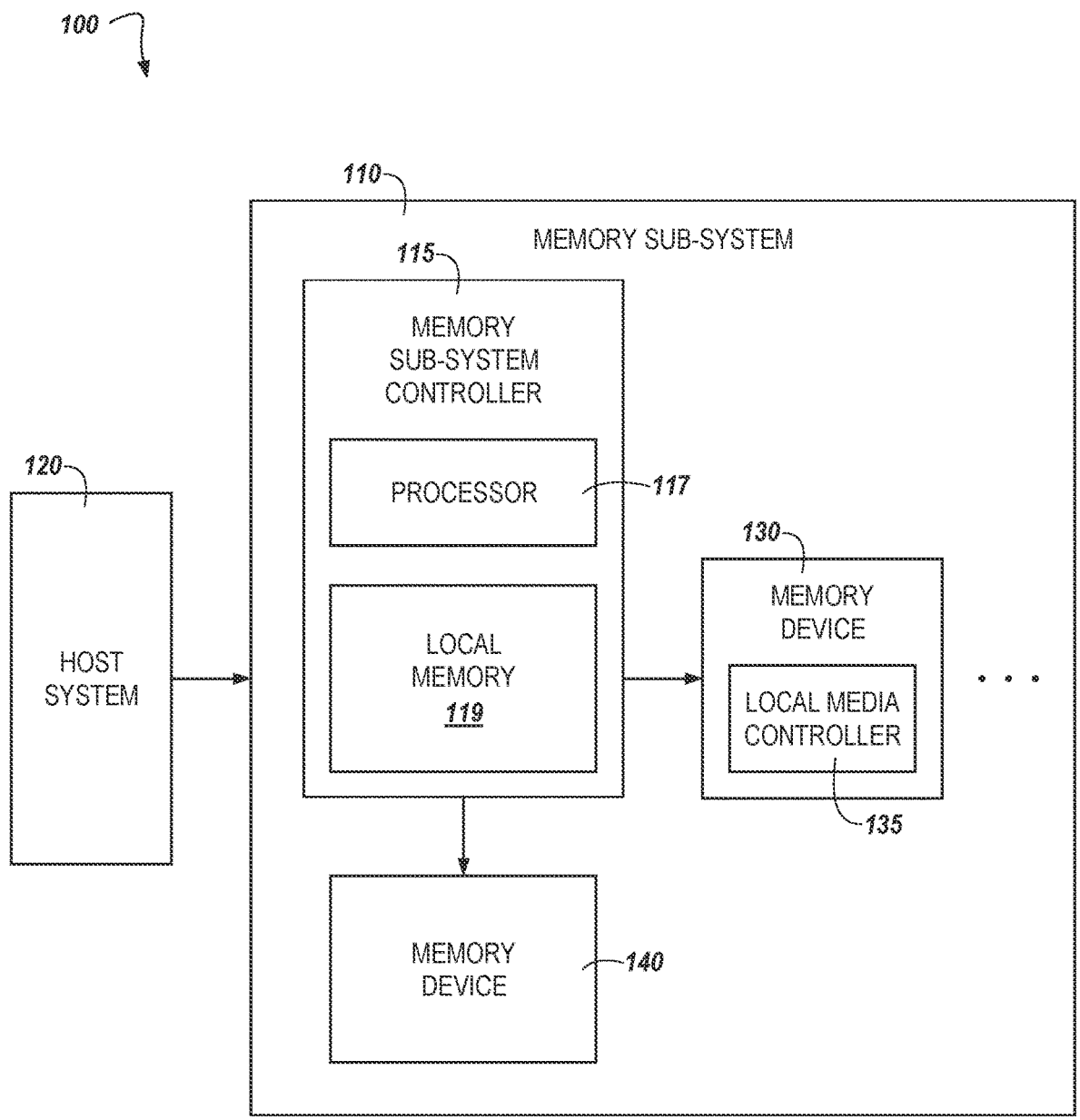
FIG. 1 illustrates an example computing system that includes a memory sub-system in accordance with some embodiments of the present disclosure.

Aspects of the present disclosure are directed to source address memory management, in particular to memory sub-systems that include circuitry to perform operations associated with source address memory management. A memory sub-system can be a storage device, a memory module, or a hybrid of a storage device and memory module. An example of a memory sub-system is a storage system, such as a solid state drive (SSD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Performance of a NAND memory device can be determined by the program speed of the NAND. That is, the speed at which it takes to program the pages of a NAND memory device. Systems can improve performance by grouping multiple NAND pages together in order to program the NAND pages concurrently. For instance, superblocks can be formed to increase system performance. A superblock, as used herein, can refer to a set of blocks that span multiple die that are written in an interleaved fashion. In some cases, a superblock may span all the die within an SSD. A superblock may contain multiple blocks from a single die. A superblock may be a unit of management within the SSD.

Traditionally, superblocks include a block from every plane in every die of a NAND memory device. However, due to non-uniformity and variation in a manufacturing process (e.g., of individual memory dies that are used to form a non-volatile memory device, such as a NAND memory device), a NAND memory device can initially include a small percentage of bad blocks. In addition, good blocks (i.e., blocks that are not classified as a bad block and that can initially reliably store data) can become bad blocks as blocks wear out during an operational lifetime of the NAND memory device.

As used herein, a bad block refers to an area of storage media that is no longer reliable for storing and retrieving data because it has been physically damaged or corrupted. Bad blocks are also referred to as bad sectors. Conversely, as used herein a good block refers to a block that is functional and can be used to stored data. When a block in a plane of any die becomes a bad block, a traditional superblock (i.e., a full superblock) is not formed. This inherently reduces the number of superblocks that can be formed and thereby reduces performance of a NAND array.

To address this problem, partial superblocks can be used. A partial superblock removes a plane across die (e.g., the partial superblock is less one or more planes than a full superblock) when that plane has a bad block. Use of partial superblocks (e.g., having at least one bad block) provides benefits to NAND devices in a number of ways. For example, with partial superblocks, as long as other planes have fewer failures, dies can be treated as good. Having fewer good blocks per plane for an acceptable die results in the need for fewer redundant blocks or planes being designed into the NAND. Thus, fewer total block counts and smaller die sizes reduce the cost per die of NAND. This effect also results in higher manufacturing yields as a single plane failure will not result in a die failure.

However, use of partial superblocks can provide a decrease in performance as compared to performance realized with a traditional full superblock. An amount of performance decrease in a partial superblock can be a function of a quantity of bad blocks in the partial superblock. Greater quantities of bad blocks can lead to greater decreases in performance. For example, an individual bad block in a partial superblock can lead to a 12.5% decrease in performance of the partial superblock, while two bad blocks in the partial superblock can lead to a 25% decrease. Greater decreases in performance can become perceptible by an end-user and/or can interfere with an operation of a memory device.

As such, some approaches attempt to reallocate blocks to reduce a quantity of partial superblocks. While this can reduce a quantity of partial superblocks it can also condense the bad blocks into the remaining partial superblock and thereby exacerbate a decrease in performance of the remaining partial superblocks. Further, in some other approaches, partial superblocks are not used (e.g., not used for data storage). However, not using these partial superblocks can also decrease system performance. The degraded performance from condensing bad blocks in partial superblocks and/or not using partial superblocks can be undesirable, especially in critical applications and/or in applications in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

As such aspects of the present disclosure address the above and other deficiencies by performing an operation to reallocate a good block in a plane to replace a bad block in the plane and thereby form partial superblocks having a quantity of bad blocks that satisfy (e.g., is less than or equal to) a bad block threshold. As used herein, reallocating a block can refer to reallocating a logical block, a physical block, or both. As used herein, the terms "physical block" and "logical block" generally refer to various characterizations of memory blocks that can be categorized by a physical location where such memory blocks are stored within a memory sub-system or a logical location in which addresses corresponding to the physical location(s) where such memory blocks are stored within the memory sub-system. For example, a "physical block" generally refers to a set of memory cells that store charges corresponding to data values. A physical block has an address (e.g., a physical block address) associated therewith. A "logical block" generally refers to a data structure that contains logical address information (e.g., a logical block address) corresponding to the physical addresses of memory locations within a physical block. Reallocating can include updating a mapping entry (e.g., an address or data indicative of an address, among other possible information) in a data structure (e.g., a table) such as a Physical to Logical (P2L) table and/or a Logical to Physical (L2P) table.

Figure 2A:
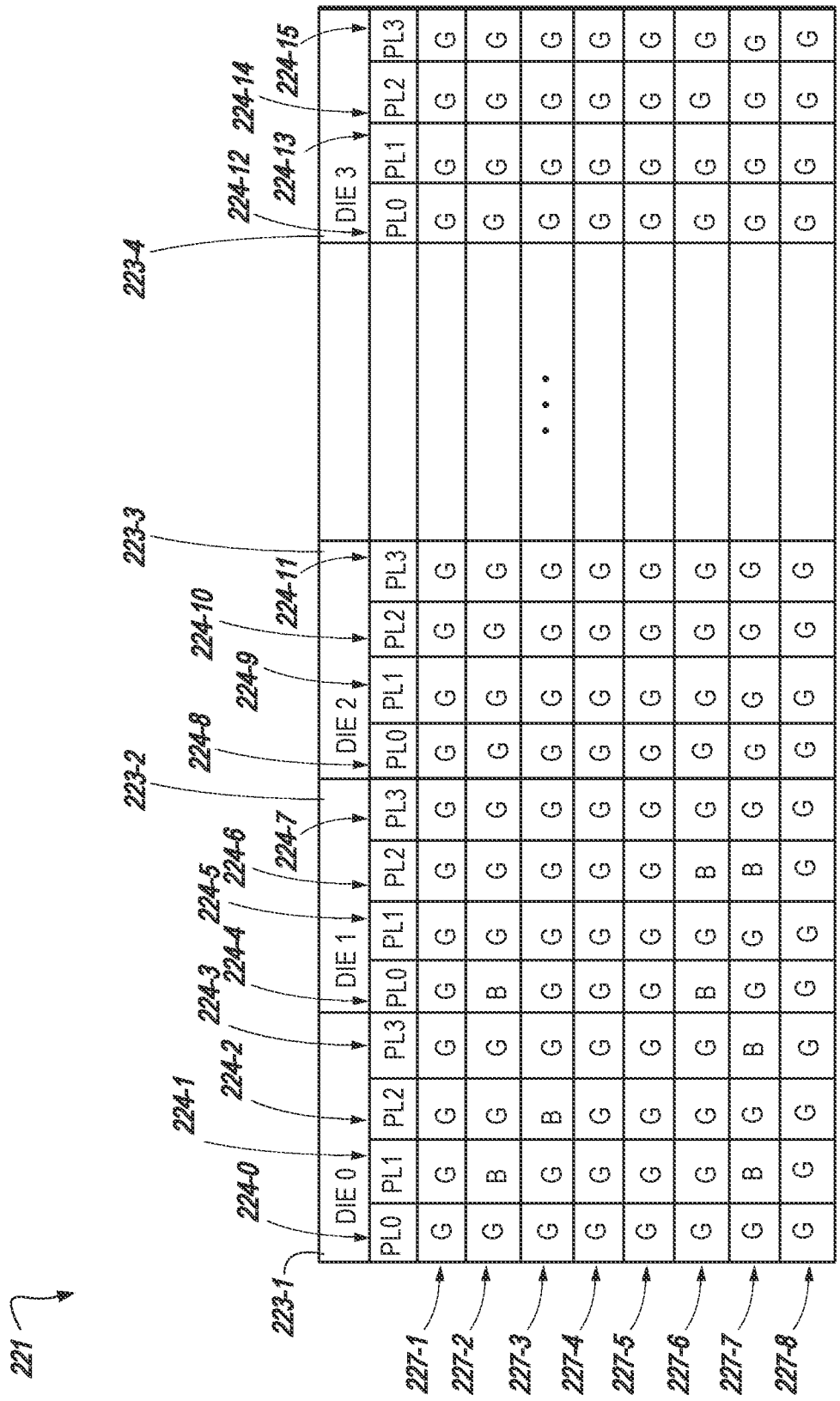
FIG. 2A illustrates an example of a non-volatile memory array in accordance with some embodiments of the present disclosure.
Figure 2B:
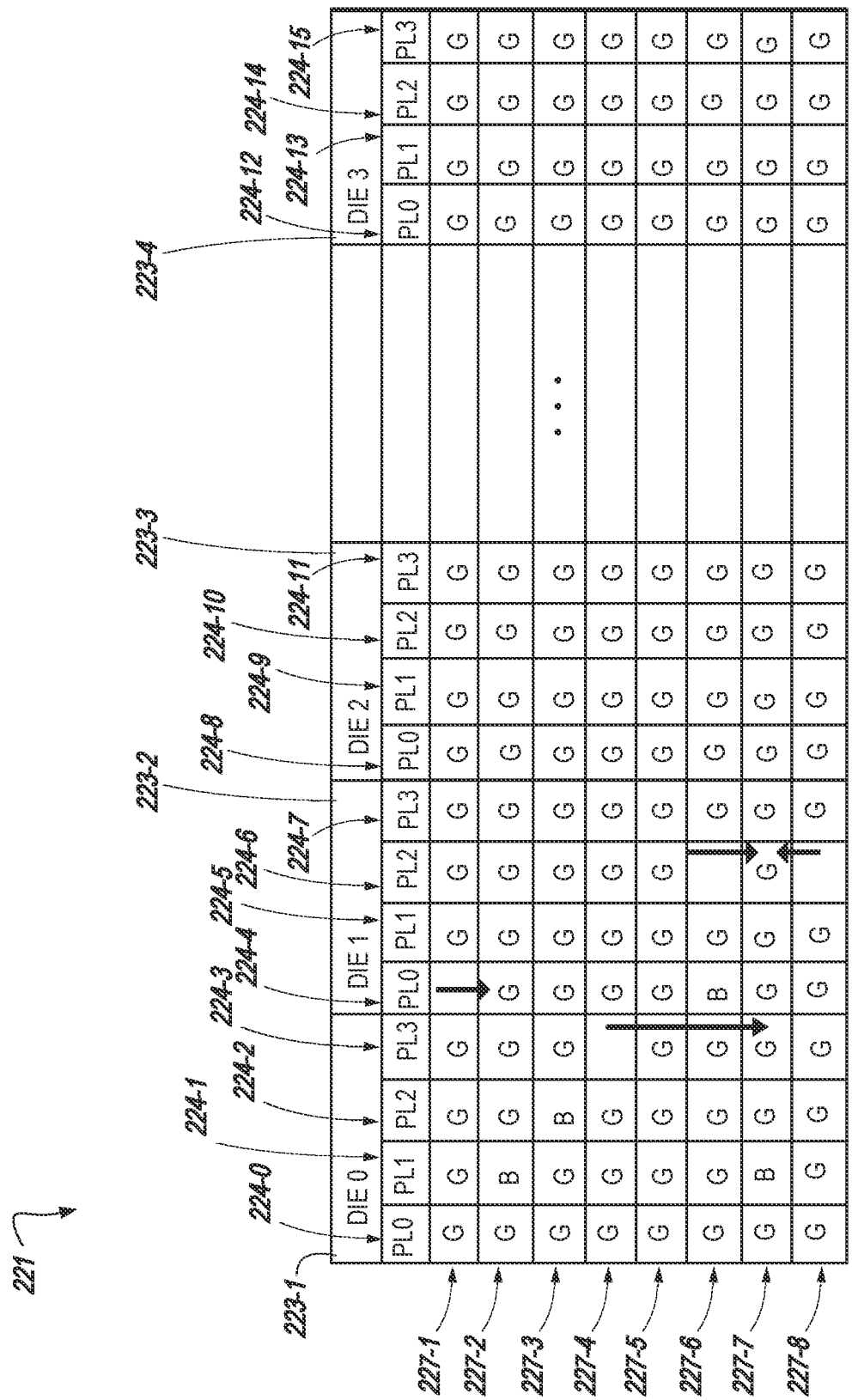
FIG. 2B illustrates another example of a non-volatile memory array in accordance with some embodiments of the present disclosure.

Accordingly, as detailed in FIG. 2A and FIG. 2B, reallocating blocks can form partial superblocks having a quantity of bad blocks that satisfy (e.g., is less than or equal to) a bad block threshold such as a bad block threshold that is equal to one bad block. Forming partial superblocks having a quantity of bad blocks that satisfy a bad block threshold can, in contrast to approaches that seek to decrease a quantity of partial superblocks, instead increase a quantity of partial superblocks, as detailed herein with respect to FIG. 2A and FIG. 2B. Increasing the quantity of partial superblocks can permit use of the partial superblocks, and yet can ensure that any performance decrease associated with a particular partial superblock is limited to an amount (e.g., an amount proportional to an individual bad block in the partial superblock) that will not be perceptible to an end user and/or significantly impact memory system performance.

However, an error can be encountered while performing a memory management operation. For example, an error can be encountered while performing a garbage collection operation in which data from a source block is transferred to a destination block. As a result, the data from the source block may not be or may not have been properly programmed to the destination block due to program fail. In such instances, the error can be handled by rewriting the data from the source block to the destination block. However, to rewrite the data an address of the source block must be known. For instance, information indicative of an address of a source block may, due to size/storage constraints on working memory, be stored in NAND. Absent such information, rewriting the data may not be possible and thus the data may be lost. As such, some approaches seek to store metadata indicative of an address of a source block. However, such approaches can lead to issues when employed in conjunction with partial superblocks. For instance, an attempt to store metadata indicative of an address of a source block in a bad block (or a block that is open due to formerly being a bad block that has been moved) can fail and thus that metadata will, if needed for recovery purposes, not be accessible. Consequently, any data in a source block may be become unrecoverable. Approaches herein can notably "shift" a block intended for storage of metadata by a threshold distance (e.g., a threshold quantity of planes/dies) within a partial superblock to ensure that the metadata is not attempted to be stored in a bad block as detailed herein at least with respect to FIG. 2C.

FIG. 1 illustrates an example computing system 100 that includes a memory sub-system 110 in accordance with some embodiments of the present disclosure. The memory sub-system 110 can form all of or a portion of an apparatus suitable for source address memory management. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, UFS, eMMC, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform memory management operations on the memory device 130). In some embodiments, a memory device 130 is a managed memory device, which is a raw memory device combined with a local controller (e.g., local media controller 135) for memory management within the same memory device package. An example of a managed memory device is a managed NAND (MNAND) device.

The memory sub-system controller 115 (controller) can include a processor 117 (processing device) configured to execute instructions stored in local memory 119 for performing the operations described herein. The controller 115 can be resident on the memory sub-system 110. As used herein, the term "resident on" refers to something that is physically located on a particular component. For example, the controller 115 being "resident on" the memory sub-system 110 refers to a condition in which the hardware circuitry that comprises the controller 115 is physically located on the memory sub-system 110. The term "resident on" can be used interchangeably with other terms such as "deployed on" or "located on," as referred to herein.

The controller 115 can be configured to identifying a quantity of bad blocks in a block of NAND memory cells. For instance, the controller 115 can identify bad blocks in respective planes of a block of NAND memory cells in a plurality of blocks of NAND memory cells. In some embodiments, the plurality of blocks of NAND memory cells can be superblocks. As mentioned, a superblock generally refers to a set of data blocks that span multiple memory dices that are written in interleaved fashion. As used herein, the terms "block," "block of memory cells," and/or "interleaved NAND memory blocks," as well as variants thereof, can, given the context of the disclosure, be used interchangeably.

In some embodiments, the controller 115 can determine that a plane of respective planes having at least one bad block include at least one good block. For instance, the controller 115 can determine that a plane of the respective planes includes at least one good block in at least one block of NAND memory cells that is different than the bad block. Determining the plane has at least one good block can permit reallocation of the at least one good block. For instance, the controller 115 can perform an operation to reallocate at least one good block in the plane to at least one bad block in the plane. Such reallocation can desirably form a block of NAND memory cells having a quantity of bad blocks that satisfy (e.g., is less than or equal to) a bad block threshold. As mentioned, forming blocks of NAND memory cells having a quantity of bad blocks that satisfies the bad block threshold can ensure that performance decrease is limited (e.g., limited to an amount proportional to an individual bad block in the partial superblock that will not be perceptible to an end user/significantly impact memory system performance), and yet can permit use of the partial superblocks as detailed herein.

FIG. 2A illustrates an example of a non-volatile memory array 221 in accordance with some embodiments of the present disclosure. In some embodiments, the non-volatile memory array 221 can be a NAND memory array. In some embodiments, the non-volatile memory array 221 can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices enumerated above.

The non-volatile memory array 221 can include a number of dies ("DIE 0") 223-1, ("DIE 1") 223-2, ("DIE 2") 223-3, ("DIE 3") 223-4 (hereinafter referred to as a number of dies 223). While illustrated as including four dies 223-1, 223-2, 223-3, and 223-4, the quantity of dies can be increased or decreased. For instance, a number of dies 223 can be equal to two dies, three dies, four dies or eight dies, among other possible number of dies.

In some embodiments, a bad block threshold can be based on a number of dies 223 and/or be based on a permissible amount of latency, such as an amount of latency that conforms to a quality of service (QoS) associated with a memory sub-system, among other permissible latencies. As described above, a "permissible" latency can generally refer to an amount of latency that is not perceptible to an end user and/or a latency that is perceptibly impacts the performance of a memory sub-system. For instance, the bad block threshold can be based on a number of dies 223 in the memory device. In some embodiments, the bad block threshold can be proportional to a number of dies in the memory device. For example, a bad block threshold can be higher (e.g., can include a greater quantity of bad blocks) for a greater number of dies 223.

The number of dies 223 can include a number of planes including a first plane 224-0, a second plane 224-1, a third plane 224-2, and a fourth plane 224-3 (e.g., "PL0", "PL1", "PL2" to "PL3" of "DIE 0" 223-1), a first plane 224-4, a second plane 224-5, a third plane 224-6, and a fourth plane 224-7 (e.g., "PL0", "PL1", "PL2", to "PL3" of "DIE1" 223-2), a first plane 224-8, a second plane 224-9, a third plane 224-10, and a fourth plane 224-11 (e.g., "PL0", "PL1", "PL2", to "PL3" of "DIE2" 223-3), and a first plane 224-12, a second plane 224-13, a third plane 224-14, and a fourth plane 224-15 (e.g., "PL0", "PL1", "PL2", to "PL3" of "DIE3" 223-4); (collectively referred to herein as "planes 224"). The number of dies 223 and the planes 224 can include a quantity of blocks of NAND memory cells (i.e., superblocks) 227-1, 227-2, 227-3, 227-4, 227-5, 227-6, 227-7 to 227-8 (hereinafter referred to collectively as superblocks 227). Each of the blocks of the superblocks 227 can be referred to as a good block as represented by ("G") or a bad block as represented by ("B").

A full superblock can refer to a superblock that includes a particular quantity of good blocks. For example, a first superblock 227-1 can be a full superblock that includes all good blocks (e.g., all blocks designated as "G") across the planes of the first die 223-1, the second die 223-2, the third dies 223-3, and the further die 223-4, as illustrated in FIG. 2A. Likewise, a fourth 227-4 superblock, a fifth 227-5 superblock, and an eighth 227-8 superblock are full superblocks. These full superblocks can be referred to as having 100% performance (or substantially 100% performance such the QoS is, at maximum, minimally impacted) or, put another way, performance that is not affected by a bad block.

As mentioned, a partial superblock can refer to a superblock with at least one bad block. For example, a second superblock 227-2 includes a first bad block (e.g., "B") in a second plane 224-1 of a first die 223-1 and a second bad block in a first plane 224-4 of the second die 223-2, as illustrated in FIG. 2A. Thus, the second superblock 227-2 may see a −25% reduction in performance when compared to a full superblock. Similarly, a sixth superblock 227-6 includes two bad blocks and may see a −25% reduction in performance, while a seventh superblock 227-7 includes three bad blocks and may see a −37.5% reduction in performance.

As mentioned, approaches herein can increase a quantity of partial superblocks. Increasing the quantity of partial superblocks can permit use of the partial superblocks, and yet can ensure any performance decrease associated with a particular partial superblock is limited to an amount (e.g., an amount proportional to an individual bad block in the partial superblock) that will not be perceptible to an end user and/or significantly impact memory system performance. For instance, as described in FIG. 2B blocks can be reallocated to form blocks of NAND memory cells (partial superblocks) having a quantity of bad blocks that satisfies (e.g., is less than or equal to) a bad block threshold.

FIG. 2B illustrates another example of a non-volatile memory array 221 in accordance with some embodiments of the present disclosure. The non-volatile memory array 221 illustrates an example of block reallocation consistent with source address memory management. As illustrated in FIG. 2B, one or more blocks from blocks of NAND memory cells (e.g., full superblocks) can be reallocated to different blocks of NAND memory cells (e.g., partial superblocks). Allocating a block from a block of NAND memory cells (e.g., from a full superblock) to different blocks of NAND memory cells (e.g., to a partial superblock) can occur in the absence of reallocating a good block from any partial superblock. Reallocating good blocks, for instance from a full superblock to a partial superblock, in the absence of reallocating a good block from any partial superblock can ensure a total quantity of partial superblocks is increased and thereby ensure that any bad blocks are evenly distributed among the resultant partial superblocks which each have a quantity of bad blocks that satisfies a bad block threshold.

For instance, the fourth superblock 227-4 includes a first good block in a fourth plane 224-3 of a first die 223-1. The first good block of the fourth superblock 227-4 can be reallocated to a bad block in the same die (the first die 223-1) and same plane (the fourth plane 224-3). For instance, the first good block in a fourth plane 224-3 can be reallocated to a first bad block in the first die 223-1 and fourth plane 224-3 of the seventh superblock 227-7.

Similarly, a second good block in the first plane 224-4 of the second die 223-2 of the first superblock 227-1 can be reallocated to a second bad block in the first plane 224-4 of the second die 223-2 of the second superblock 227-2, a third good block in the third plane 224-6 of the second die 223-2 of the fifth superblock 227-5 can be reallocated to a third bad block in the third plane 224-6 of the second die 223-2 of the sixth superblock 227-6, and a fourth good block in the third plane 224-6 of the second die 223-2 of the eighth superblock 227-8 can be reallocated to a fourth bad block in the third plane 224-6 of the second die 223-2 of the seventh superblock 227-7. Reallocating can include updating a mapping entry in a data structure such as a Physical to Logical (P2L) table and/or a Logical to Physical (L2P) table. For example, a logical block and/or physical block (e.g., a good block) can be reallocated by updating a mapping entry in a table of a physical and/or logical mapping (from a different physical and/or logical block such as a physical and/or logical block associated with a bad block) to the physical and/or logical block associated with the good block.

As illustrated in FIG. 2B each of the superblocks 227-1 to 227-8 can be a partial superblock having the same quantity of bad blocks (e.g., one bad block) that satisfies a bad block threshold (e.g., one bad block). That is, FIG. 2A includes four partial superblocks 227-2, 227-3, 227-6, and 227-7, while FIG. 2B includes 8 partial superblocks 227-1 to 227-8. As mentioned, increasing the quantity of partial superblocks can permit use of the partial superblocks, and yet can ensure any performance decrease associated with a particular partial superblock is limited to an amount (e.g., an amount proportional to an individual bad block in the partial superblock) that will not be perceptible to an end user/significantly impact memory system performance. However, increasing the quantity of partial superblocks due to the presence of a bad block can impact the performance of a memory management operation such as storing metadata associated with a memory management operation, as detailed above.

Figure 2C:
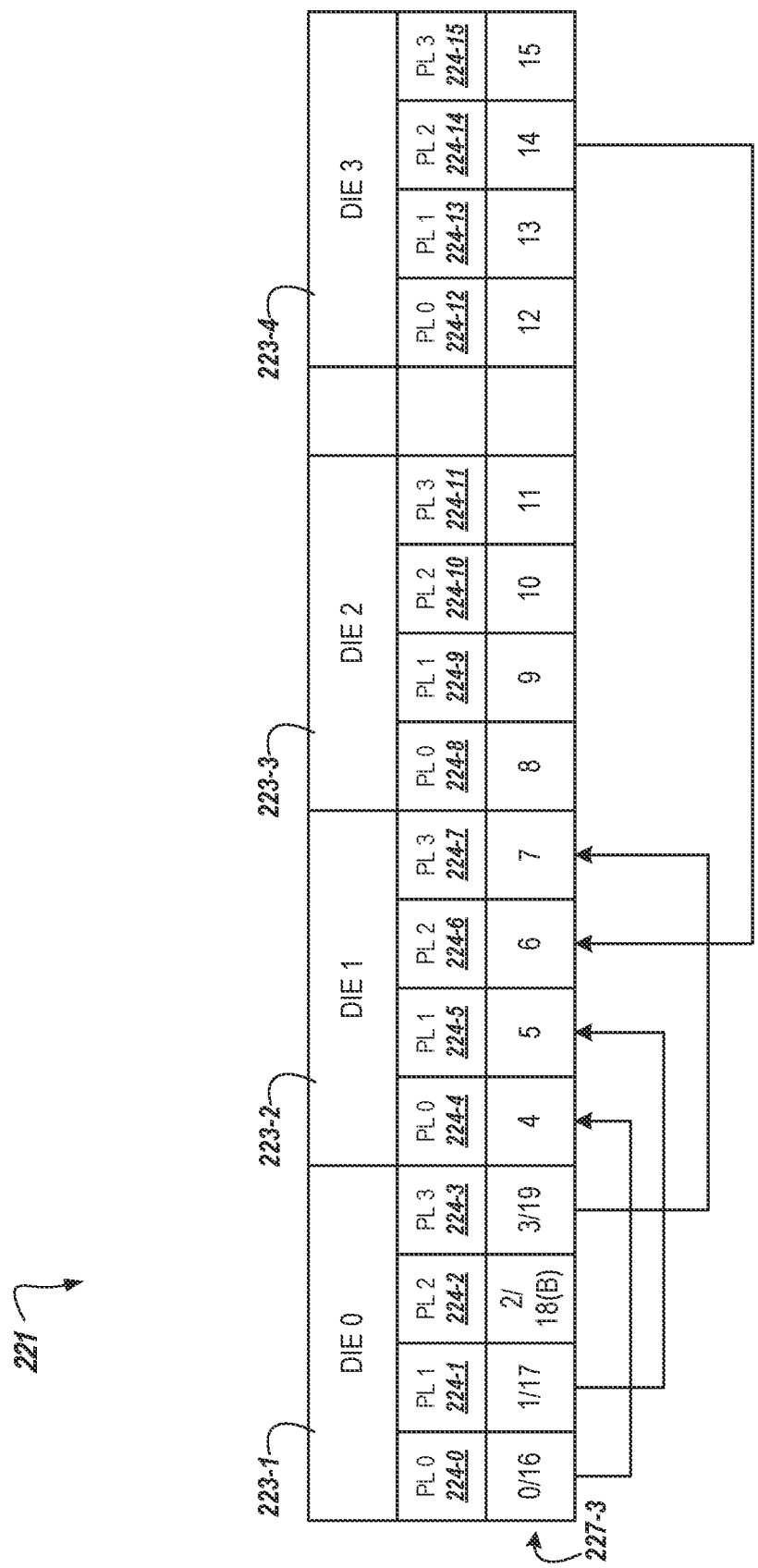
FIG. 2C illustrates an example of portion of a non-volatile memory array in accordance with some embodiments of the present disclosure.

As such, approaches herein account for the presence of a partial superblock when storing metadata indicative of an address of a source block in a memory management operation. For instance, FIG. 2C illustrates an example of portion of a non-volatile memory array 221 in accordance with some embodiments of the present disclosure. The superblock 227-3 is illustrated in FIG. 2C. The superblock 227-3 is formed of the number of dies 223 and the number of planes 224.

Each plane of the number of planes 224 can have a respective identifier, namely a respective recording plane index that identifies the particular plane. For example, as illustrated in FIG. 2C, the first plane 224-0 (e.g., "PL0") can have a respective recording plane index ("e.g., 0"). In some instances, each plane in the same die as a bad block (e.g., the bad block located in the third plane 224-2 of the first die 223-1) can have an additional recording index value. For instance, the first plane 224-0 (e.g., "PL0") in the first die 223-1 can have a respective recording plane index ("e.g., 0" and "16"). In various embodiments, selecting the metadata block can be based on a respective plane index value associated with each block included in the superblocks.

For instance, a metadata block can typically be selected that is a first threshold distance (e.g., 4 planes) away from a destination block, as indicated by the arrow from the block of the first plane 224-0 to the block of the first plane 224-4. That is, the arrows indicate selection of a metadata data block that is a threshold distance away from a destination block. Notably, the metadata block can be shifted a second threshold distance further (e.g., 1 die) when a bad block is encountered. Stated differently, to ensure a bad block (e.g., as identified in a bad block pool) is not selected as a metadata block, a different block that is a second threshold distance (e.g., a threshold quantity of planes/dies) from the bad block can instead be selected as the metadata block. In this way, blocks that are a first threshold distance or a combination of a first threshold distance and a second threshold distance can be selected as metadata blocks, as detailed herein.

In some embodiments, the threshold distance (e.g., the first threshold distance and/or the second threshold distance) is based on a total quantity of dies in the memory subsystem, or a total quantity of planes in the memory subsystem, or both. When a total quantity of dies is larger and/or when a total quantity of planes is larger, the threshold distance can be greater. For instance, when a total quantity of dies is equal to three or more dies then the threshold distance can be equal to one or more dies, whereas when the total of quantity of dies is equal to two or less dies then the threshold quantity can be equal to one or planes.

In some embodiments, the threshold distance be equal to one or more planes, equal to two or more planes, equal to three or more planes, equal to four or more planes, or equal to four or more planes, among other possibilities. In some embodiments, the threshold distance can be equal to one or more dies, equal to two or more dies, equal to three or more dies, or equal to four or more dies, among other possibilities.

In some embodiments the threshold distance can be equal to a sum of a quantity of planes and a quantity of dies away from a bad block. For instance, in some embodiments, the threshold distance can be equal a first threshold distance that is equal to a quantity of planes (e.g., 4 planes) plus a second threshold distance that is equal to a quantity of die (e.g., 1 die) such that the combined threshold distance is equal to a sum of the first threshold distance and the second threshold distance (e.g., 4 planes and 1 die) away from the destination block.

For example, a source block in a first plane (e.g., the first plane 224-0 in the superblock 227-1 in the first die 223-1) can be selected for a memory management operation. A destination block in a second plane (e.g., the third plane 224-14 in the superblock 227-3 in the fourth die 223-4) can be selected for the memory management operation.

A metadata block in a third plane can be selected. The metadata block can be in the same die or a different die than the destination block. In some embodiments, the destination block in the second plane can be included in a first die and the metadata block in the third plane can be included in a second die. In such examples, the first die (e.g., "DIE 0") and the second die (e.g., "DIE 1") can be neighboring dies that are physically adjacent to each other. However, in some examples, each of the destination block and the metadata block can be in the same die. For instance, a destination block can be selected that is in a first die and a metadata block can be selected that is also in the first die.

As mentioned, the respective plane index values of the blocks can be utilized when selecting a metadata block. For example, a destination block in a second plane (e.g., the third plane 224-14 in the superblock 227-3 in the fourth die 223-4) can be equal to "14." In such instances, selection of a block that is a first threshold distance (e.g., four planes) away from the destination block would result in the selection of the bad block (e.g., the bad block as identified with "B" at the third plane 224-2 in the superblock 227-3 in the first die 223-1 having a plane index of "2") in a fourth plane as the metadata block. As such, when a bad block is encountered approaches herein shift the metadata block a second threshold distance away from the bad block. For instance, approaches herein responsive to encountering a bad block instead select a block (e.g., at the third plane 224-6 in the superblock 227-3 in the second die 223-2) with a respective plane index value of "6" and therefore is a sufficient distance (e.g., one plane, one die, etc.) away from the bad block. As illustrated in FIG. 2C, the threshold distance can be equal to an absolute value (e.g., 8) of a difference between a respective plane index value (e.g., 14) of the destination block and a plane index value (e.g., 6) of the metadata block. In this way, the metadata block can be shifted a threshold distance to a block having a higher or lower block index value than the destination block.

As mentioned, shifting the metadata block to a different plane and/or die than a destination block can ensure that an error encountered with regard to the destination block itself, a plane in which the destination block is included, or even an entire die in which the destination block is included, does not impact the ability to obtain the metadata indicative of the address of the source block from the metadata block that is in a different plane or even a different die than the destination block. That is, while FIG. 2C illustrates shifting the metadata to a different die, in some approaches the metadata block can be shifted a threshold quantity of planes and yet remain in the same die. Such approaches can be particularly useful in deployments such as mobile deployments that have fewer quantity of dies (e.g., two dies) and yet still ensure that the metadata block is shifted to a different plane than a destination block.

Figure 3:
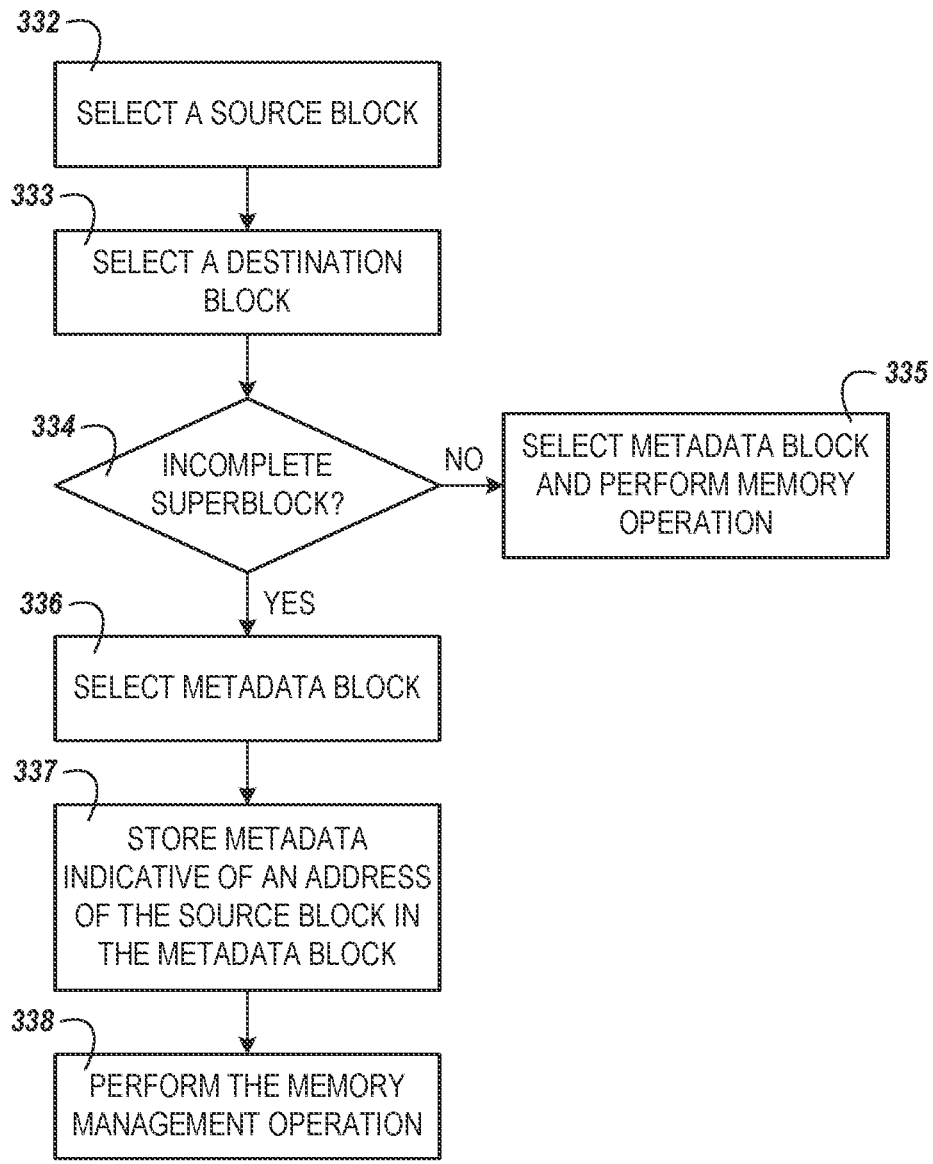
FIG. 3 illustrates an example flow diagram of source address memory management in accordance with some embodiments of the present disclosure.

FIG. 3 illustrates an example flow diagram 331 of source address memory management in accordance with some embodiments of the present disclosure. At 332, a source block can be selected. As used herein, a "source block" generally refers to a memory block utilized to transfer valid data from during a memory management operation. Various memory management operations such as wear leveling operations and garbage collection operations can be performed on a selected source block. For instance, a data structure such as a table can store a quantity of valid physical translation units (PTUs) per block (e.g., a valid translation count (VTC)). In such instances, a source block can be selected based on the quantity of valid physical translation units, for instance, selection of a block having the lowest VTC as a source block, among other possibilities. In some instances, a wear leveling operation can include tracking (e.g., via a data structure such as a table) a bin associated with a memory block. The bin associated with a memory block can indicate an age of data in the memory block. Such approaches can select a memory block having the highest bin index (e.g., the oldest data) as a source block, among other possibilities. Other mechanisms and criteria for source block selection are also possible.

At 333, a destination block for the memory management operation can be determined. As used herein, a "destination block" generally refers to a block to be utilized to transfer valid data to during a memory management operation. In some examples, determining a destination block can be performed is based, at least in part, on a type of the memory management operation and/or an error count rate of blocks. As used herein, an "error count rate" generally refers to a quantity of errors corrected by an error correction operation over a period of time. In some instances, the destination block can be selected that has a relatively high error count rate. However, in some instances the destination block can be selected that has a relatively low error count rate.

At 334, whether the destination block is in an incomplete superblock can be determined. For instance, the superblock in which the destination block is included can be determined to be a complete superblock or an incomplete superblock based on a block pool in which blocks of the superblock are contained. In some instances, whether a block is a good block or a bad block can be determined based the block satisfying a failure conduction. For instance, it can be determined that a read, a write, or both to a given block fails. In which case, the block can be deemed to satisfy a failure conduction and can then be designated as a bad block (e.g., designated as a bad block in a block pool). Examples are not so limited, however, and in some embodiments, a block can be designated as a bad block based on a quantity of program-erase cycles experienced by the block, a raw bit error rate associated with the block, etc. Conversely, a read, a write, or both to a given block may be successful (e.g., successfully store data at and/or read data from the block) and the block can then be designated as a good block.

Responsive to a determination that the destination block is included in a complete superblock the flow 331 can proceed to 335. At 335 the memory management operation can be performed. For instance, a metadata block can be selected (without having to account for the presence of any bad blocks) and the memory management operation can be performed.

However, responsive a determination that the destination block is included in an incomplete superblock (e.g., a superblock including at least one bad block) the flow 331 can proceed to 336. At 336, a metadata block can be selected. The metadata block can be in the same superblock or a different superblock than the destination block. The metadata block can be a threshold quantity of planes and/or dies away from a plane and die of a destination block and/or a plane and die of a bad block. For instance, the metadata block can be a first threshold distance (e.g., four planes) away from a destination block and can be a second threshold distance (e.g., 1 die) away from a bad block for a shifting of the metadata block four planes and 1 die away from the destination block, among other possible values.

At 337, metadata indicative of an address of the source block can be stored in the metadata block. As mentioned, the metadata can be indicative of a physical address, or a logical address, or both, of the source block. For instance, the metadata can include information corresponding to a physical address of the source block. At 338, the memory management operation can be performed. For instance, a memory management operation such as a garbage collection operation can be performed to transfer data from the source block to the destination block.

Figure 4:
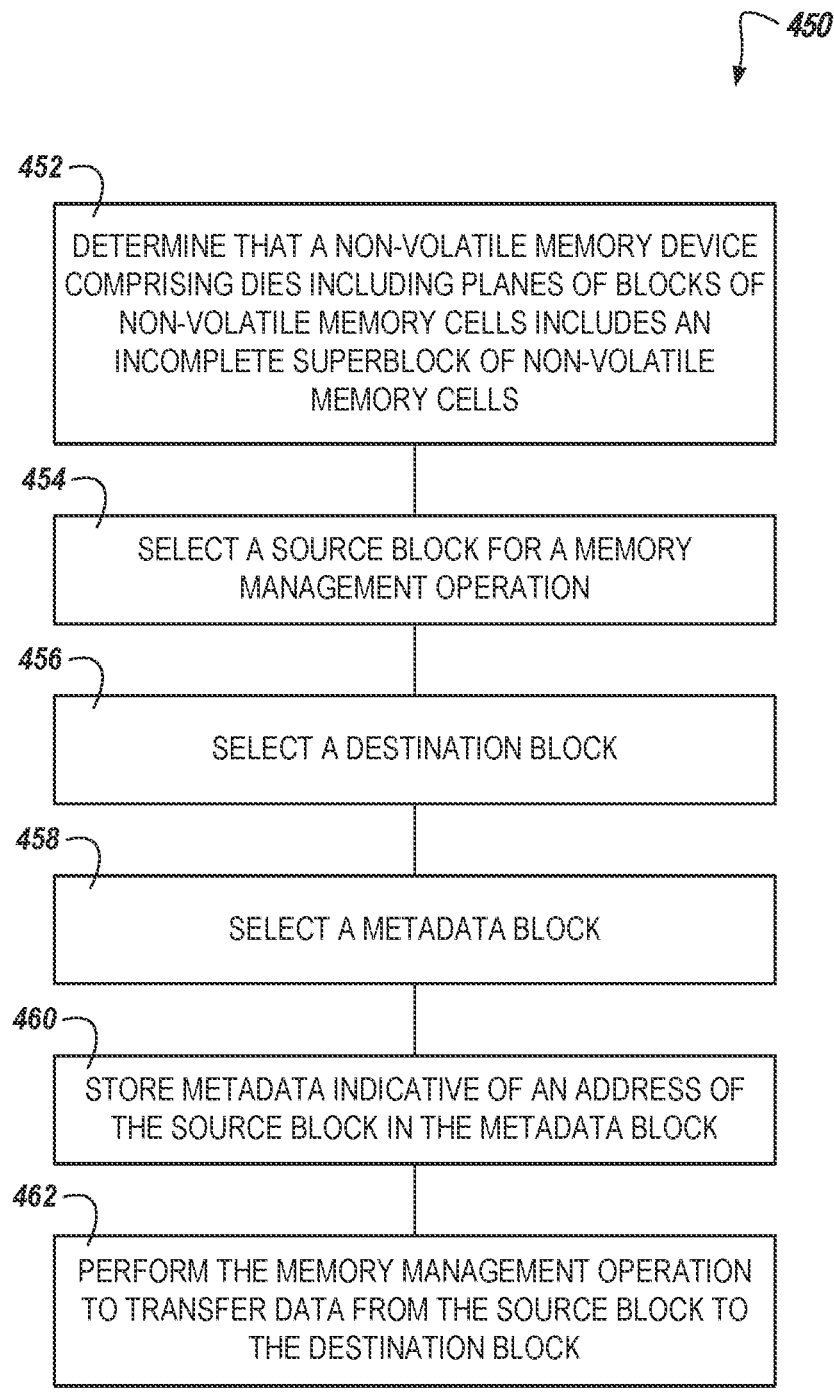
FIG. 4 illustrates an example method for source address memory management in accordance with embodiments of the present disclosure.

FIG. 4 is a flow diagram corresponding to a method 450 for source address memory management in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 452, planes of blocks of non-volatile memory cells can be determined to include an incomplete superblock of memory cells. The presence of the incomplete superblock can be determined based on the presence of one or more bad blocks. For instance, a quantity of bad blocks in respective planes of a block of non-volatile memory cells (e.g., NAND memory cells) can be identified. In some embodiments, a particular quantity of bad blocks can be determined at a beginning of usage of the memory system by a user, subsequent to manufacturing testing, at a particular life cycle in the usage of the memory system, etc. For instance, the quantity of bad blocks can be identified prior to native use, or use by a user. As an example, the quantity of bad blocks can be identified during a testing and/or manufacturing phase of the memory sub-system.

At 454, a source block of non-volatile memory cells (i.e., a source block) in a first plane can be selected for a memory management operation, as detailed herein. At 456, a destination block of non-volatile memory cells (i.e., a destination block) in a second plane can be selected for a memory management operation, as detailed herein. The second plane can be in the same plane or be in a different plane than the first plane. The second plane can be in the same die or be in a different die than the first plane.

At 458, a metadata block of non-volatile memory cells (i.e., a metadata block) in a third plane can be selected. In some embodiments, the third plane can be in a different plane than the second plane. As mentioned, having the third plane be in a different plane than the second plane can promote retention of metadata indicative of a source address of the source block and permit use of the metadata, even in instances when an entirety of the second plane experiences an error. In some embodiments, the third plane can be in a different plane and a different die than the second plane. As mentioned, having the third plane be in a different plane and die than a respective die (e.g., a second die) in which the second plane is included can promote retention of metadata indicative of a source address of the source block and permit use of the metadata, even in instances when an entirety of the respective die in which the second plane is included experiences an error. However, in some approaches such as those with a fewer quantity of memory die (e.g., a total quantity of two memory die) it may be desirable to have the third plane be in a different plane but in the same die as the second plane.

At 460, metadata indicative of an address of the source block can be stored in the metadata block. The metadata can be indicative of a logical address of the source block, a physical address of the source block, or both. For instance, information corresponding to a physical address and/or a logical address of the source block can be stored in the metadata block.

At 462, a memory management operation can be performed on the source block and/or the destination block. For instance, a memory management operation can be a garbage collection operation that is performed to transfer data from the source block to the destination block. Stated differently, performing the memory management operation can include performing a garbage collection operation on the source block by writing the data from the source block to the destination block.

In some embodiments, performance of the memory management operation can be initiated (e.g., a scan can be conducted) responsive to completion of the storing of the metadata indicative of the address of the source block in the metadata block. In this way, the memory management operation can be initiated when the metadata indicative of the source address is stored in the metadata block and therefore is available to permit recovery of the data in the source block in the event of encountering an error during performance of the memory management operation.

In some embodiments, the metadata indicative of the address of the source block that is stored in the metadata block can be erased (e.g., an erase operation can be performed on the metadata block) responsive to completion of the memory management operation. Completion of the memory management operation can be determined based on validation of the data in the destination block, among other possibilities. In this way, the metadata indicative of the source address can be erased from the metadata block and the metadata block can be returned to a free block pool to permit further/alternate use of the metadata block once storage of the metadata indicative of the address of the source block is no longer serves a purpose (e.g., once the data from the source block has been transferred to a destination block and is validated).

Figure 5:
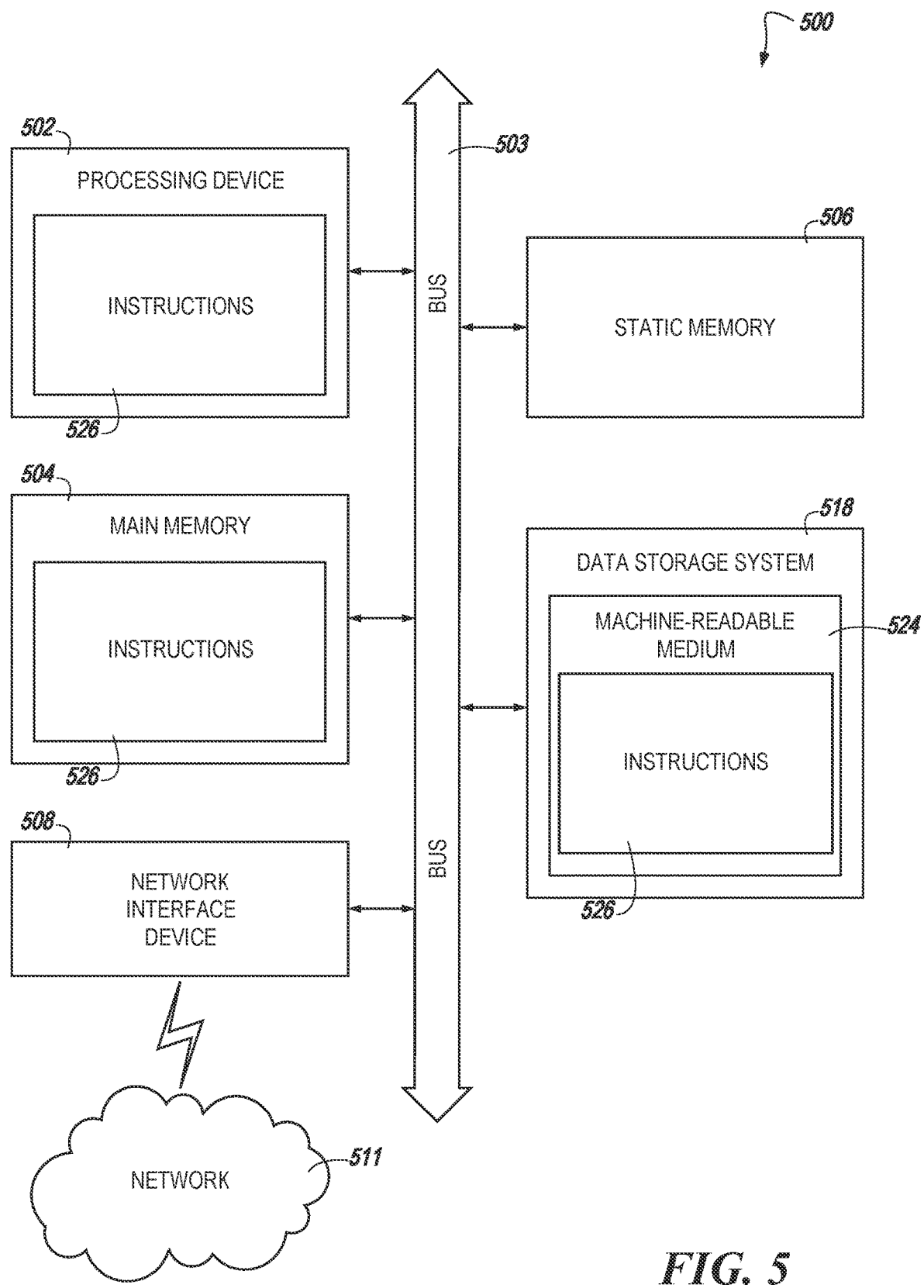
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 503.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 511.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to source address based memory management, as detailed herein. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and as described herein, those of ordinary skill in the art will appreciate that an arrangement calculated to achieve the same results can be substituted for the specific embodiments shown. This disclosure is intended to cover adaptations or variations of one or more embodiments of the disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the disclosure includes other applications in which the above structures and processes are used. Therefore, the scope of one or more embodiments of the disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    determining that a non-volatile memory device comprising dies including planes of blocks of non-volatile memory cells includes an incomplete superblock of memory cells;
    selecting, from the blocks of non-volatile memory cells, a source block in a first plane for a memory management operation;
    selecting a destination block in a second plane;
    determining the destination block in the second plane is in the incomplete superblock;
    responsive to the determining that the destination block is in the incomplete superblock, selecting a metadata block in a third plane;
    storing metadata indicative of an address of the source block in the metadata block; and
    performing the memory management operation to transfer data from the source block to the destination block.

2. The method of claim 1, further comprising:
    selecting the destination block in the second plane in a first die; and
    selecting the metadata block in the third plane in a second die.

3. The method of claim 2, wherein the second die is physically adjacent to the first die.

4. The method of claim 2, further comprising:
    selecting the destination block in the second plane in a first die; and
    selecting the metadata block in the third plane in the first die.

5. The method of claim 1, further comprising selecting the metadata block in the third plane that is a threshold distance away from the destination block.

6. The method of claim 5, wherein the threshold distance is equal to one or more planes.

7. The method of claim 6, wherein the threshold distance is equal to one or more dies.

8. The method of claim 6, wherein the threshold distance is equal a sum of a first threshold distance and a second threshold distance.

9. The method of claim 1, wherein performing the memory management operation further comprises performing a garbage collection operation on the source block by writing the data from the source block to the destination block.

10. The method of claim 1, wherein the metadata is indicative of a logical address of the source block or a physical address of the source block, or both.

11. A system, comprising:
    a memory sub-system comprising a plurality of memory components comprising a plurality superblocks of memory cells; and
    a processing device coupled to the plurality of memory components, the processing device to perform operations comprising:
        selecting a source block in a first plane of one of the memory components for a memory management operation;
        selecting a destination block in a second plane of the one of the memory components;
        determining the destination block is included in an incomplete superblock;
        responsive to determining the destination block is included in the incomplete superblock, determining a threshold distance from a block in the incomplete superblock;
        selecting a metadata block in a third plane of the one of the memory components that is the threshold distance away from the block;
        storing metadata indicative of an address of the source block in the metadata block; and
        performing the memory management operation to transfer data from the source block to the destination block.

12. The system of claim 11, wherein determining the threshold distance is based on a total quantity of dies in the memory sub-system, or a total quantity of planes in the memory sub-system, or both.

13. The system of claim 11, wherein selecting the metadata block is based on a respective plane index value associated with each block included in the superblocks of memory cells.

14. The system of claim 13, wherein an absolute value of a difference between a respective plane index value of the source block and a plane index value of metadata block is equal to the threshold distance.

15. An apparatus comprising:
    a memory device comprising a plurality of memory components arranged to form a stackable cross-gridded array of interleaved non-volatile memory cells; and
    a processing device coupled to the plurality of memory components, the processing device to perform operations comprising:
        selecting a source block in a first plane of a first die of a particular memory component among the plurality of memory components for a memory management operation;
        selecting a destination block in a second plane of the particular memory component;
        determining the destination block is in an incomplete superblock;
        responsive to determining that the destination block is the incomplete superblock, selecting a metadata block in a third plane of the particular memory component that is a threshold number of dies away from the second plane;
        storing metadata indicative of an address of the source block in the metadata block; and
        performing the memory management operation to transfer data from the source block to the destination block.

16. The apparatus of claim 15, wherein the interleaved non-volatile memory cells further comprise interleaved NAND memory cells.

17. The apparatus of claim 15, wherein performing the memory management operation is initiated responsive to completion of the storing of the metadata indicative of the address of the source block in the metadata block.

18. The apparatus of claim 17, further comprising erasing the metadata indicative of the address of the source block in the metadata block responsive to completion of the memory management operation.

* * * * *